R. A. MAGILL.
AUTOMOBILE SAFETY APPLIANCE.
APPLICATION FILED MAY 31, 1911.

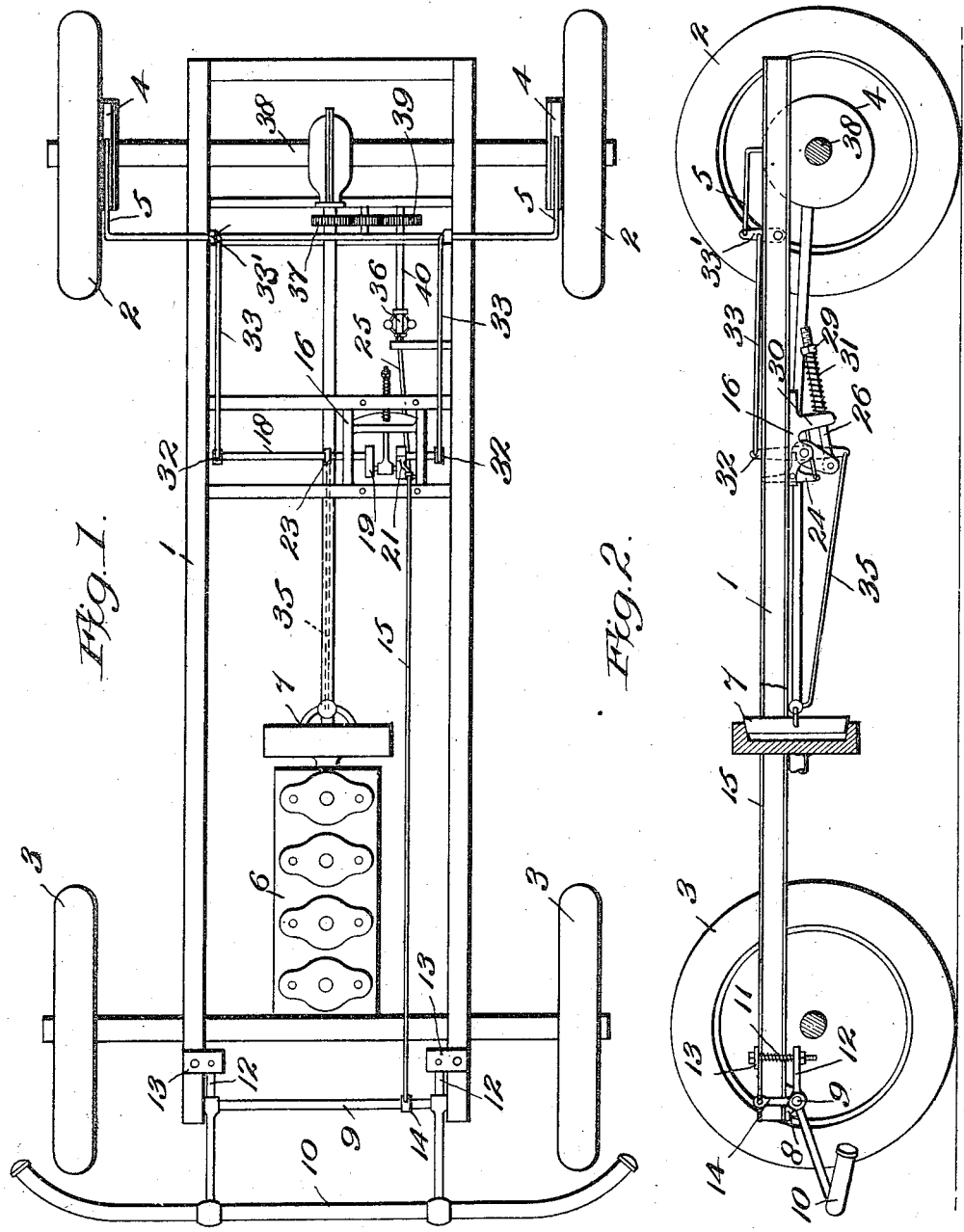

1,060,611.

Patented May 6, 1913.
2 SHEETS—SHEET 2.

Witnesses
Byron B. Collings.
Geo. F. Payne.

Inventor
Richard A. Magill
by J. A. Mathews
Attorney

UNITED STATES PATENT OFFICE.

RICHARD A. MAGILL, OF ATLANTA, GEORGIA.

AUTOMOBILE SAFETY APPLIANCE.

1,060,611. Specification of Letters Patent. Patented May 6, 1913.

Application filed May 31, 1911. Serial No. 630,532.

*To all whom it may concern:*

Be it known that I, RICHARD A. MAGILL, citizen of the United States of America, residing at Atlanta, in the county of Fulton and State of Georgia, have invented certain new and useful Improvements in Automobile Safety Appliances, of which the following is a specification.

This invention relates to automobile safety appliances and particularly to that class of appliances for automatically stopping the engine and applying the brakes in cases of emergency; and it has for its object to provide a means that may be connected to any make of automobile or in fact to vehicles generally; one that may be comparatively simple in construction, easy of attachment and positive in its operation.

A further object is to provide a device of this character that may be constructed and so arranged that an automobile may be allowed to operate only at a given speed, thereby practically eliminating the well known practice of "joy riding."

With these and other objects in view the invention consists in the novel details of construction and combination of parts more fully hereinafter described and particularly pointed out in the claims.

Figure 3:
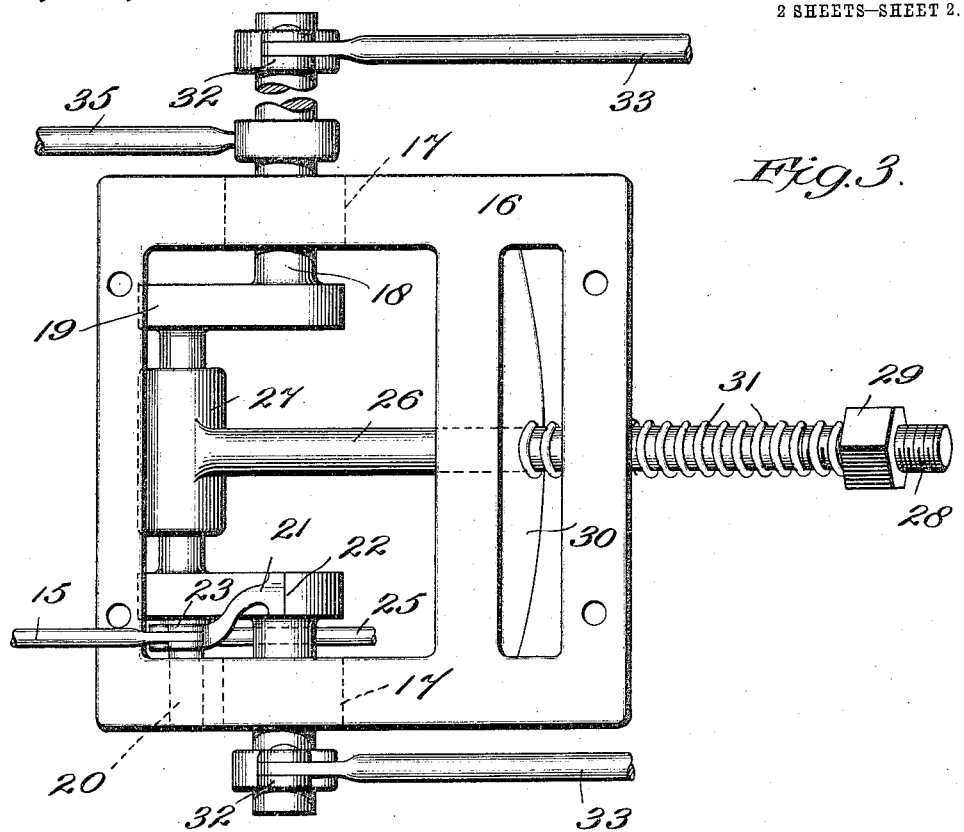
Figure 4:
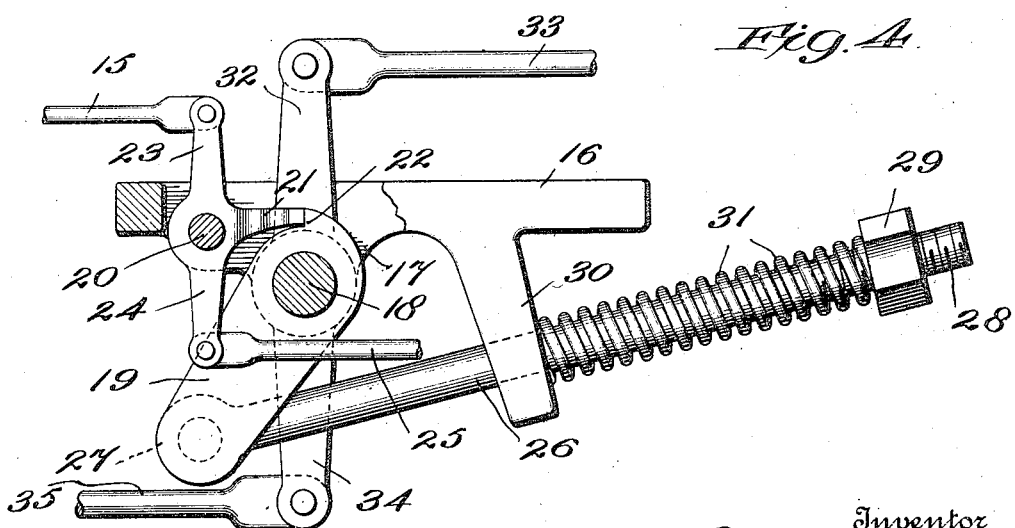

Referring to the drawings forming a part of this specification in which like numerals designate like parts in the different views:—Figure 1 is a plan view of the chassis of an automobile equipped with my improved device; Fig. 2 is a side elevational view thereof, with parts shown broken away for clearness; Fig. 3 is a detail plan view of the attaching bracket and its connected parts; and, Fig. 4 is a side elevational view thereof with parts shown broken away for clearness.

The automobile illustrated in the drawings is of the usual form and construction and comprises the frame 1 mounted on suitable driving wheels 2 and steering wheels 3 which are operated in the usual manner. Suitable brakes 4 are applied to the rear wheels and are normally operated by the rods 5 connected to the usual mechanism not shown. The automobile is driven by the engine 6 suitably mounted thereon, through the friction clutch mechanism 7 or any other appropriate means.

Pivotally supported by brackets 8, that are mounted on the front of the vehicle frame, is a rod 9 on which is mounted a fender 10, that is adapted to be normally held in the position shown, by the springs 11 that are in turn held between the rearward extending portions 12 of the fender, and the plates 13 secured to the frame and connected to said arm 9 is the connecting rod 15 for operating the mechanism that will be hereinafter described.

Suitably connected to the frame of the machine near its rearward end is the bracket 16 having bearings 17 (see Figs. 3 and 4) in which is mounted the crank shaft 18. Pivoted on the stud 20, held in the bracket 16, is a pawl 21 which is adapted to engage the notch 22 on the crank 19. This pawl 21 is provided with an upward extending arm 23 and a lower extending arm 24, which arm 23 is connected to the rod 15 which leads to the fender 10. The arm 24 has connected thereto a rod 25 which operates the speed controlling mechanism that will be hereinafter described.

26 indicates a rod having an enlarged bearing portion 27 connected to the crank 19 and at its other end it is provided with the screw threaded portion 28 on which is held the adjusting nut 29. Surrounding the rod 26 and held between the nut 29 and the downward extending portion 30, on the bracket 16, is a coil spring 31 which is adapted to hold the operating mechanism in its normal position as indicated in Fig. 4.

Mounted on the crank shaft 18 and at both ends thereof are two upwardly extending arms 32 which have connected thereto rods 33 which are in turn connected to the pivoted arms 33' mounted on the frame. The brake rods 5 are connected to the pivoted arms 33' for applying the brakes when the mechanism is automatically operated.

34 indicates a downward extending arm mounted on the crank shaft 18 which has connected thereto one end of the connecting rod 35. The other end of this connecting rod 35 is secured to the clutch mechanism 7 for throwing the clutch out of operation when the automatic mechanism is operated.

The speed controlling mechanism comprises the governor 36 mounted on the frame 1 in any suitable place and which is operated by the gearing 37 and 39 from the shaft 35 as shown in Fig. 1. The rod 25 connects the governor with the pawl 21 for operating the automatic mechanism when an automobile has exceeded a given speed. Any suitable arrangement for adjusting the governor to automatically operate the above described mechanism may be employed.

This improved safety appliance is adapted to be applied to automobiles of any make and to be located at any convenient place thereon and to be protected by any suitable casing.

The operation is as follows: Supposing all the parts to be set in their normal position as that indicated on the drawings. When the fender comes into contact with an obstacle of any kind it rocks on the rod 9, and through the arm 14, causes the connecting rod 15 to trip the pawl 21 and releases the crank 19 which under the tension of the spring 31 rocks on the crank shaft 18. The rocking of the crank shaft causes the arm 34 connected thereto to pull on the connecting rod 35 and release the clutch mechanism 7. Simultaneously with the releasing of the clutch mechanism, the brakes are applied, through the arms 32, connecting rods 33, pivoted arms 33', and rods 5.

Instead of the above described operation taking place through the action of an obstacle striking the fender this may be accomplished through the action of the governor, which on account of being connected through gearing to the drive shaft governs the speed of the automobile. Supposing the governor to be set to a certain predetermined speed as prescribed by law and the driver exceeds the speed limit, the pawl 21, through the connecting rod 25 and arm 24 will immediately be tripped and the operation above described will be repeated. After the several parts have been actuated by either the fender or the brake, they would be restored to operative position by hand.

It is obvious that those skilled in the art may vary the details of construction and arrangement of parts without departing from the spirit of my invention and therefore I do not wish to be limited to such features except as may be required by the claims.

What I claim is:—

1. The combination with a motor driven vehicle having a wheel brake and clutch driving connections, of means for automatically applying the brake and disconnecting said clutch connections comprising; a bracket mounted on the vehicle frame; a crank shaft journaled on said bracket; connections between said crank shaft and said brake; connections between said crank shaft and one of the clutch connections; a spring tensioned rod mounted on said bracket and connected with the crank shaft and adapted to actuate the same; a pawl pivotally mounted on the bracket and adapted to engage with and hold the crank shaft in set position; a fender movably mounted on the vehicle; connections between said fender and said pawl adapted to release the pawl through the movement of the fender; a governor for the vehicle; and connections between said governor and said pawl for actuating the pawl to release the crank shaft whereby to apply the brake and disconnect the clutch connections, substantially as described.

2. The combination with a motor driven vehicle having a wheel brake and clutch driving connections of means for automatically applying said brake and disconnecting said clutch driving connections comprising a bracket mounted on the frame of the vehicle; a crank shaft journaled on said bracket; oppositely disposed arms mounted on said crank shaft; connections between said arms, the wheel brake, and one of said clutch driving connections; a spring tensioned rod mounted on the bracket and connected with and normally tending to actuate said crank shaft; a pawl pivotally mounted on said bracket and adapted to engage with and hold the crank shaft in set position; a pair of oppositely disposed arms secured to said pawl; a fender swingingly mounted on the vehicle; a rod connecting said fender and one of said pawl arms and adapted to actuate the pawl arm to release the pawl through the movement of the fender; a governor for the vehicle; and a rod connecting said governor with the other pawl arm adapted to actuate said pawl arm to release the pawl through the speed of the governor, substantially as described.

In testimony whereof I affix my signature in presence of two witnesses.

RICHARD A. MAGILL.

Witnesses:
 Geo. T. Curry, Jr.,
 S. A. Morrison.